May 28, 1940.  H. F. PARKER  2,202,023
FLUID MOTOR
Filed Oct. 17, 1936  6 Sheets-Sheet 1
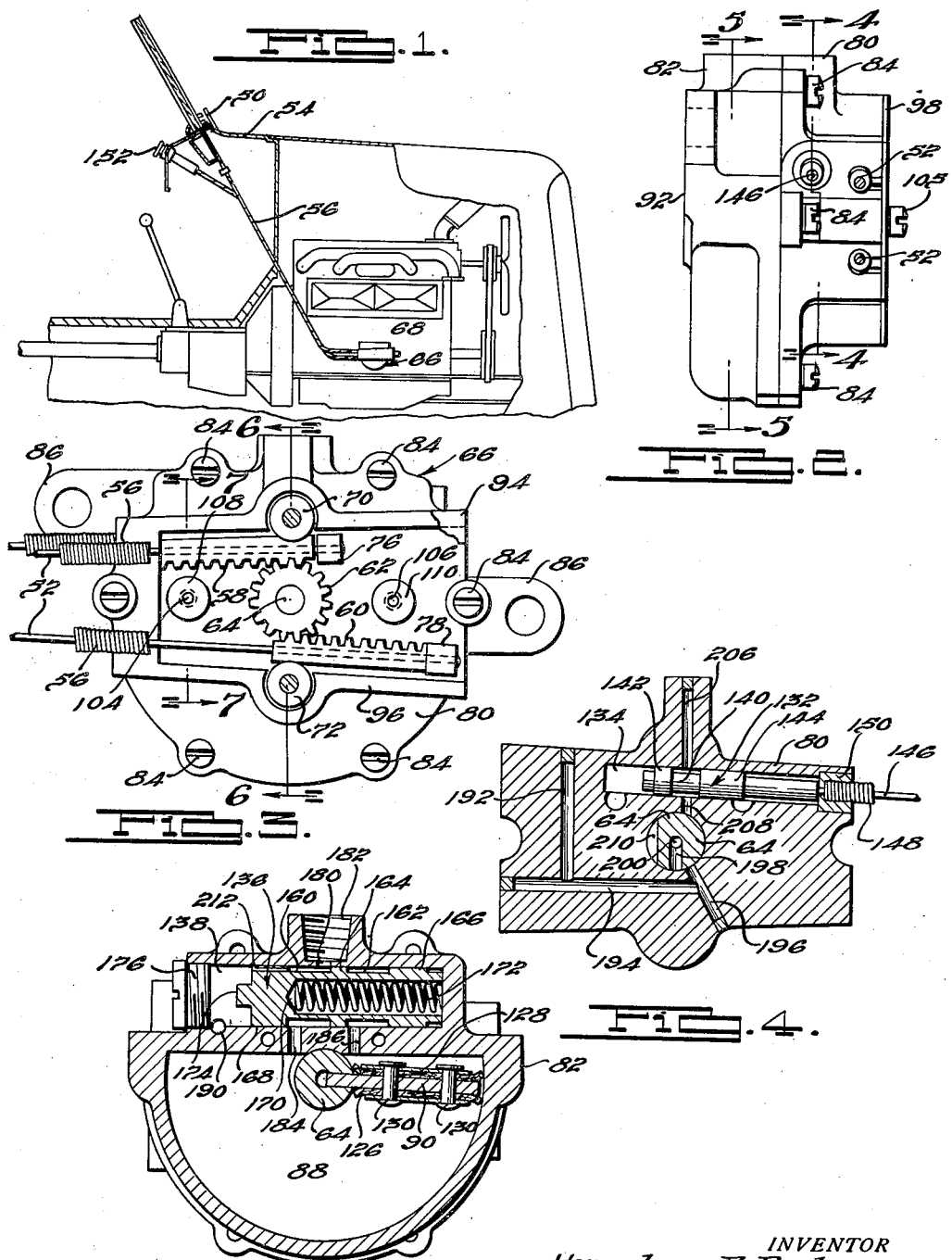
INVENTOR
Humphrey F. Parker.
BY
Harness, Dickey, Pierce & Hann.
ATTORNEYS.

May 28, 1940. H. F. PARKER 2,202,023
FLUID MOTOR
Filed Oct. 17, 1936 6 Sheets-Sheet 2
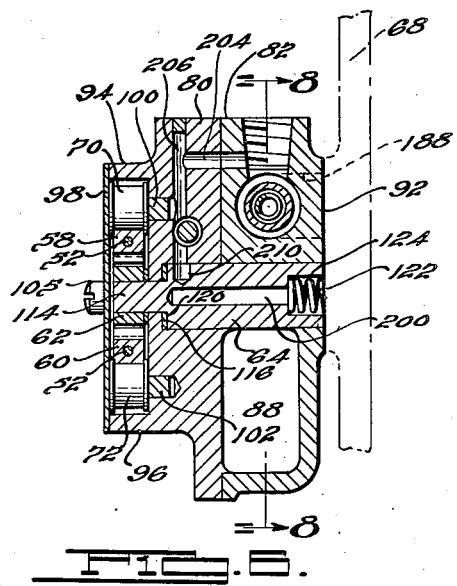
FIG. 6.
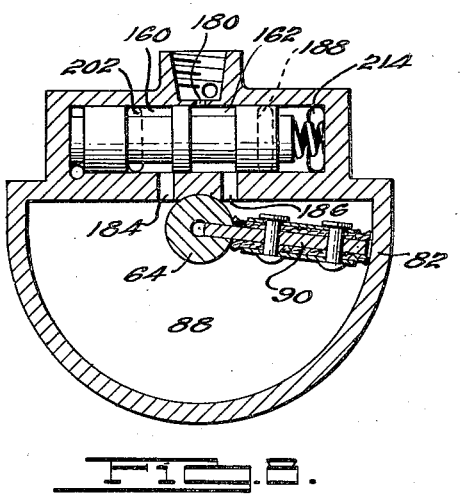
FIG. 8.
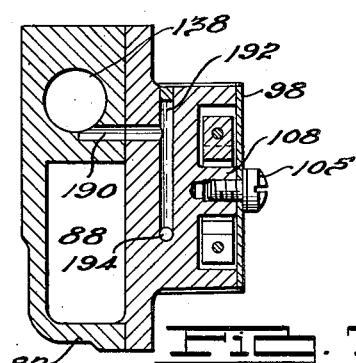
FIG. 7.
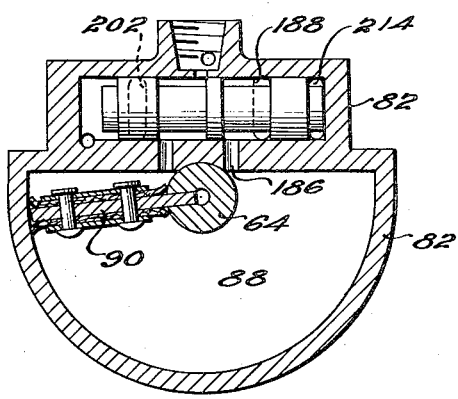
FIG. 9.
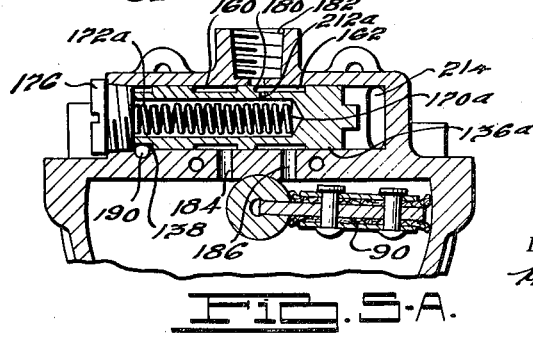
FIG. 5-A.
INVENTOR
Humphrey F. Parker
BY
Harness, Dickey, Pierce & Hann
ATTORNEYS May 28, 1940.  H. F. PARKER  2,202,023
FLUID MOTOR
Filed Oct. 17, 1936  6 Sheets-Sheet 3

INVENTOR
Humphrey F. Parker
BY
Harness, Dickey, Pierce & Hann
ATTORNEYS.

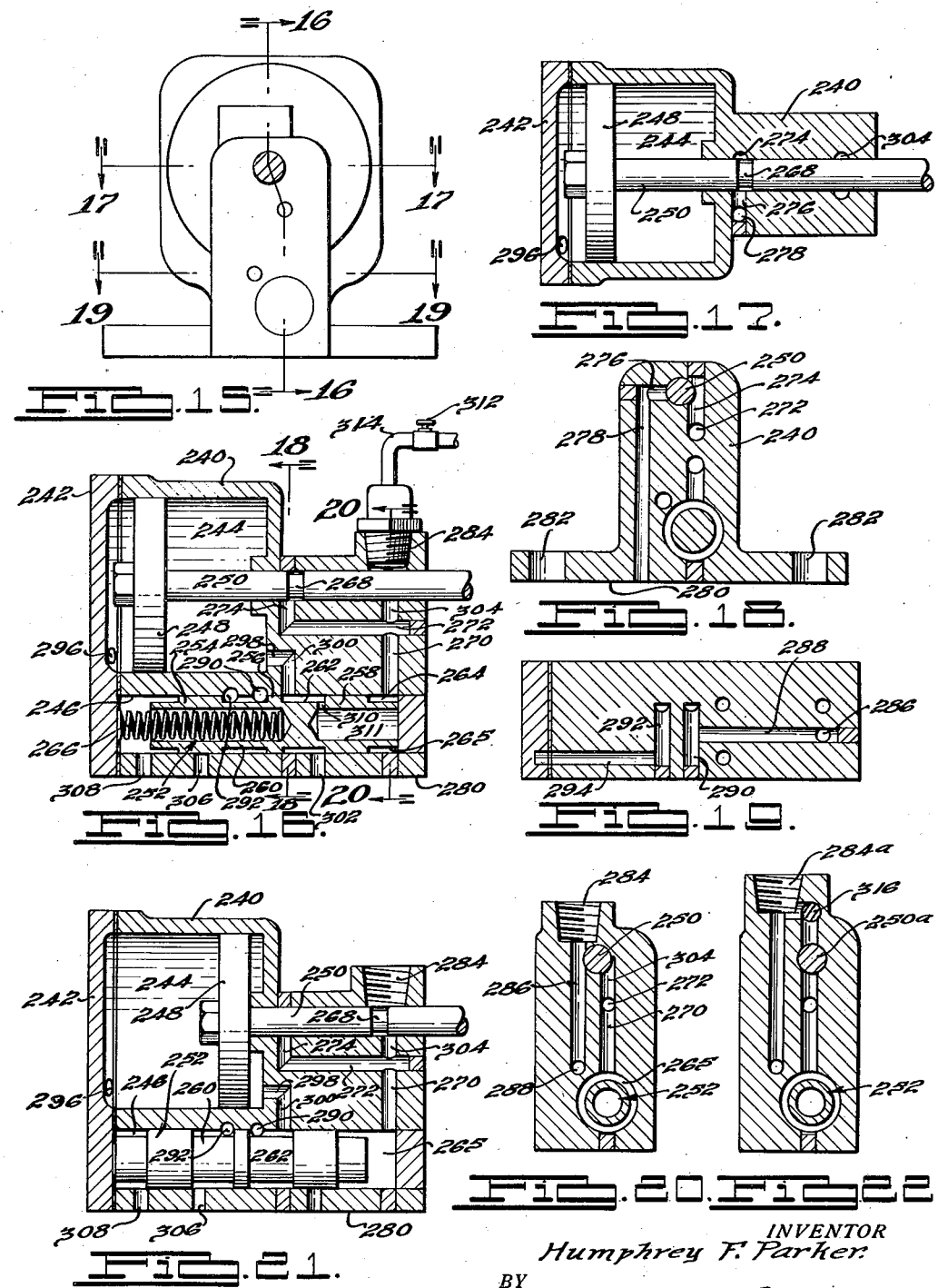

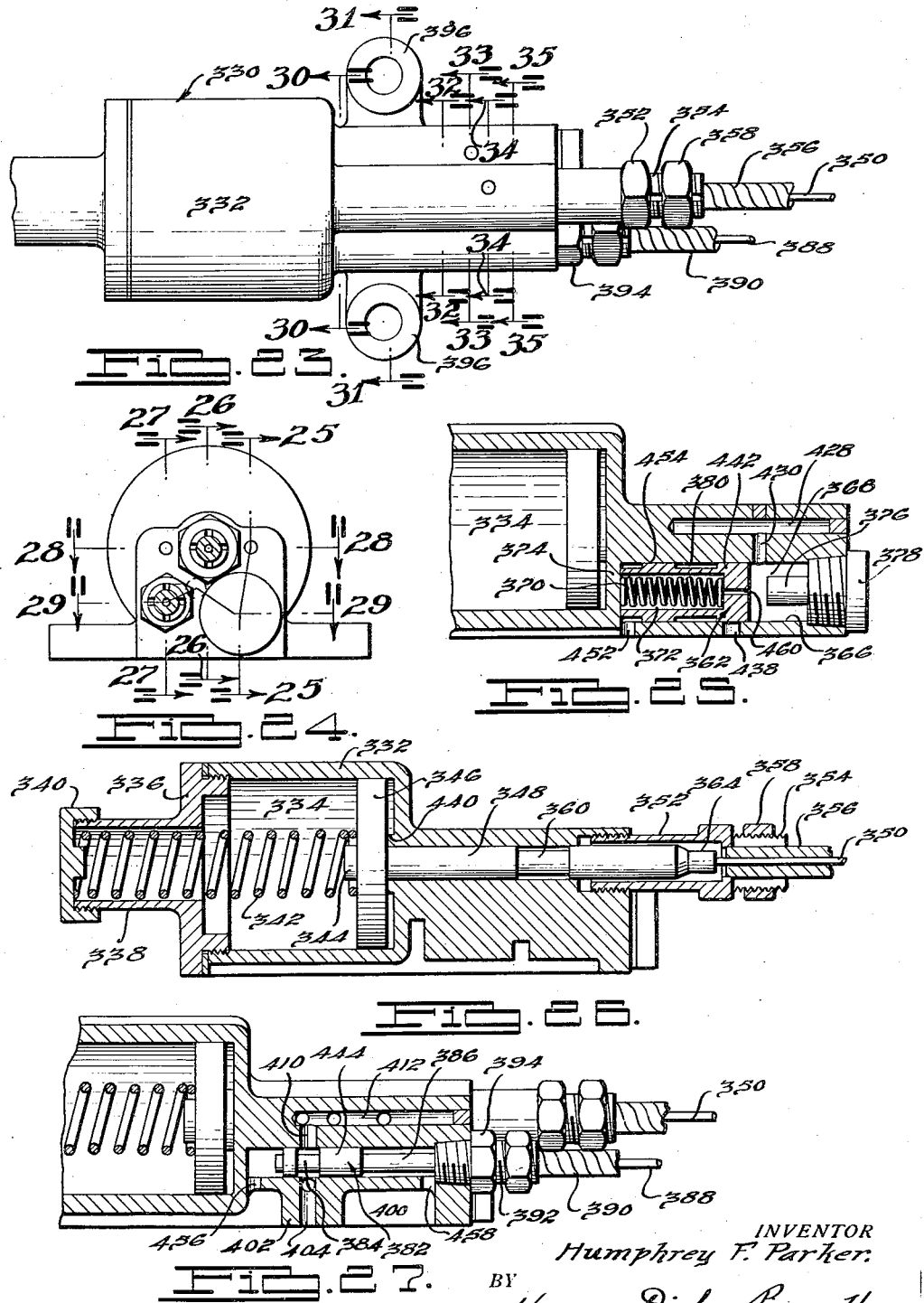

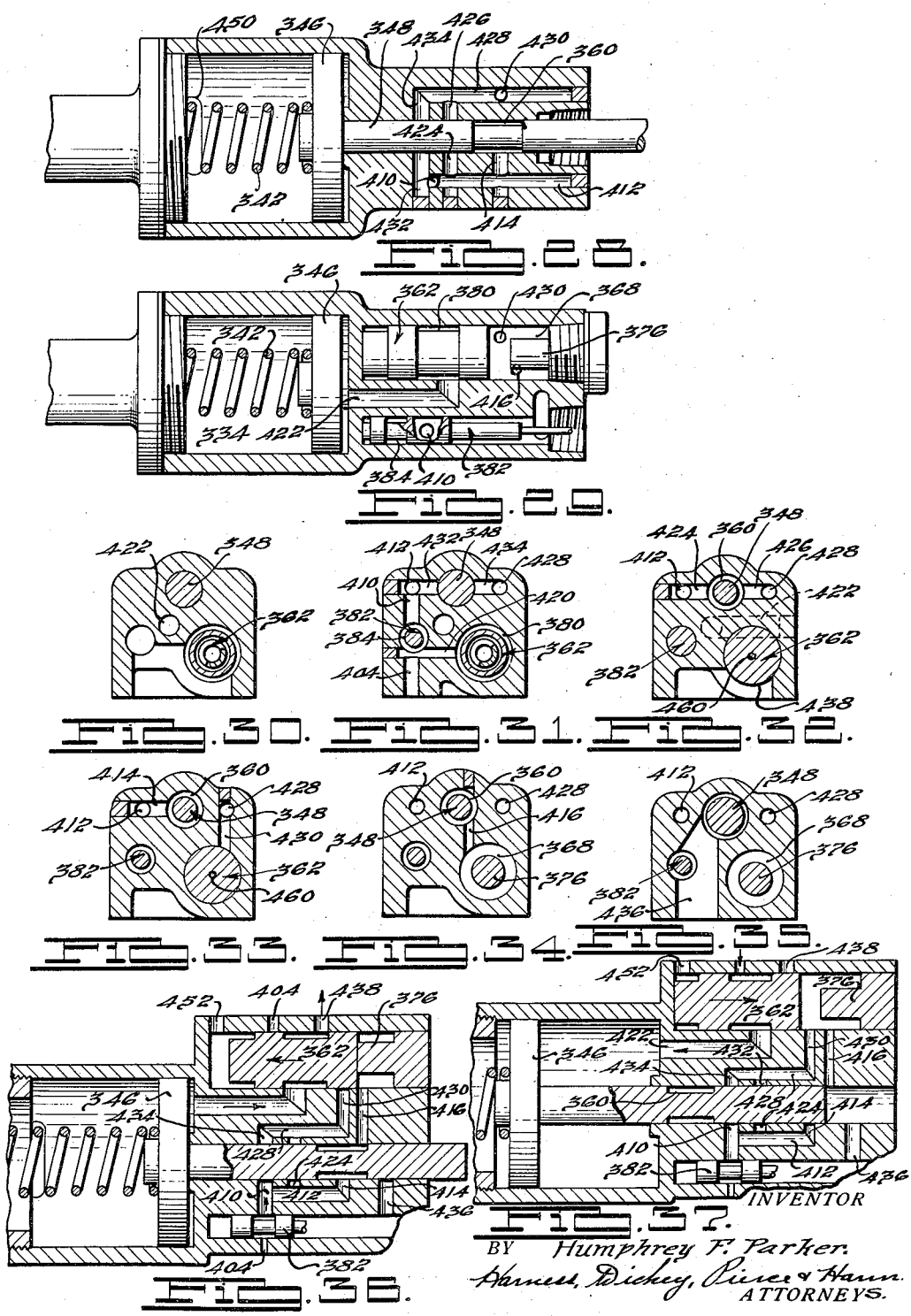

Patented May 28, 1940

2,202,023

UNITED STATES PATENT OFFICE 2,202,023

FLUID MOTOR

Humphrey F. Parker, Detroit, Mich.

Application October 17, 1936, Serial No. 106,134

8 Claims. (Cl. 121—150)

The present invention relates to fluid pressure operated motor mechanisms, and in particular provides improvements in fluid pressure operated motors adapted particularly for use in connection with vehicle windshield wiper systems.

Objects of the present invention are to provide improvements in fluid pressure operated motors, and to provide motor constructions which may be economically manufactured and assembled and which afford positive and efficient operation; to provide improvements which may be embodied in fluid pressure operated motors of either the vane or the piston type; to provide improvements which may be embodied in motors adapted to be automatically brought to rest at selected predetermined positions in the normal stroke thereof or in positions beyond the normal stroke thereof; and to provide improvements which may be embodied in motors adapted for variable speed operation.

Further objects of the present invention are to provide improved fluid pressure operated motor mechanisms utilizing reversing valve mechanisms of the fluid pressure operated type; to provide such constructions in which the reversing valve mechanisms is movable in one direction under the influence of fluid pressure, and is movable in the other direction under the influence of spring pressure; to provide such constructions in which the movement of the vane or piston controls the supply to, and discharge of, actuating fluid from the valve mechanism; to provide such constructions in which the stopping of the motor in a selected position may be effected by controlling the supply of fluid to the valve; to provide such constructions in which the stop control mechanism may be arranged to bring the motor to rest at a normal limit position or at a position beyond such normal limit position; to provide such constructions embodying improved means including secondary passages to insure completion of the valve movements in each instance; and to provide motor constructions of the above generally stated type in which the selectively operable shut-off valve may be provided with means to vary the speed of operation of the motor, as well as to effect the starting and stopping thereof.

Further objects of the present invention are to provide a motor of the above generally described character of the oscillating vane type, in which the movements of the valve are selectively controlled by passages formed in and controlled by the shaft of the vane; to provide a motor construction of the above generally described arrangement, of the double acting piston type, in which the movements of the reversing valve are selectively controlled by passages associated with and partially formed by the motor piston rod; and to provide a motor construction as above generally stated of the single acting piston type in which the movements of the piston in one direction are controlled by fluid pressure and in which the movements of the piston in the other direction are effected by spring pressure.

With the above and other, as well as more specific objects in view, preferred but illustrative embodiments of the invention are shown in the accompanying drawings, throughout which corresponding reference characters are used to designate corresponding parts, and in which:

Figure 1 is a general view in elevation showing the general arrangement of a vehicle windshield operating system embodying an improved motor of the present invention;

Fig. 2 is a view in end elevation of the vane type motor shown generally in Fig. 1;

Fig. 3 is a view in rear elevation of the improved vane type motor;

Fig. 4 is a view in vertical longitudinal section, taken along the line 4—4 of Fig. 2;

Fig. 5 is a view in vertical longitudinal section, taken along the line 5—5 of Fig. 2;

Fig. 5a is a fragmentary view of a modification of the structure of Figs. 2 through 9, and corresponding generally to Fig. 5;

Fig. 6 is a view in vertical transverse section, taken along the line 6—6 of Fig. 3;

Fig. 7 is a view in vertical transverse section, taken along the line 7—7 of Fig. 3;

Fig. 8 is a view in vertical longitudinal section, taken along the line 8—8 of Fig. 6;

Fig. 9 is a view corresponding generally to Fig. 3, but showing the motor vane in a different operation position;

Fig. 15 is a view in end elevation of a motor of the double acting piston type;

Fig. 16 is a view in vertical longitudinal section, taken along the line 16—16 of Fig. 15;

Fig. 17 is a view in horizontal section, taken along the line 17—17 of Fig. 15;

Fig. 18 is a view in vertical transverse section, taken along the line 18—18 of Fig. 16;

Fig. 19 is a view in horizontal section, taken along the line 19—19 of Fig. 15;

Fig. 20 is a view in vertical transverse section, taken along the line 20—20 of Fig. 16;

Fig. 21 is a view corresponding generally to Fig. 16 but showing the piston in the opposite limit position;

Fig. 22 is a view in vertical transverse section corresponding generally to Fig. 20 but illustrating the adaptation of the motor for control by a parking valve;

Fig. 23 is a view in top plan of the invention as embodied in a motor of the single acting piston type;

Fig. 24 is a view in end elevation of the motor shown in Fig. 23;

Fig. 25 is a view in vertical longitudinal section, taken along the line 25—25 of Fig. 24;

Fig. 26 is a view in vertical longitudinal section, taken along the line 26—26 of Fig. 24;

Fig. 27 is a view in vertical longitudinal section, taken along the line 27—27 of Fig. 24;

Fig. 28 is a view in horizontal section, taken along the line 28—28 of Fig. 24;

Fig. 29 is a view in horizontal section, taken along the line 29—29 of Fig. 24;

Fig. 30 is a view in vertical transverse section, taken along the line 30—30 of Fig. 23;

Fig. 31 is a view in vertical transverse section, taken along the line 31—31 of Fig. 23;

Fig. 32 is a view in vertical transverse section, taken along the line 32—32 of Fig. 23;

Fig. 33 is a view in vertical transverse section, taken along the line 33—33 of Fig. 23;

Fig. 34 is a view in vertical transverse section, taken along the line 34—34 of Fig. 23;

Figure 11:
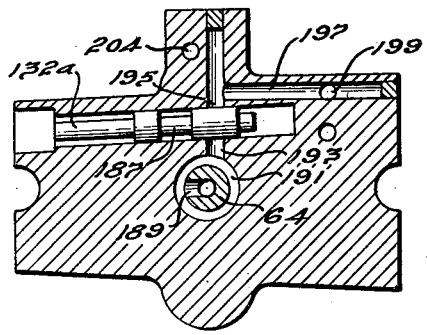
Fig. 11 is a view in vertical section, taken along the line 11—11 of Fig. 10.

Fig. 35 is a view in vertical transverse section, taken along the line 35—35 of Fig. 23; and Figs. 36 and 37 are diagrammatic views based upon the motor of Figs. 23 through 35, showing the piston thereof in opposite extreme positions, and showing, in schematic form, the arrangements of the valve passages.

A preferred application of the improved fluid pressure motors of the present invention is in connection with the operation of the windshield wiper mechanisms of automobiles. It will be appreciated, however, from a complete understanding of the invention, that the improved motors may be used in widely different applications. Preferably also, the motors are designed to be operated by positive fluid pressure, and the preferred actuating fluid is lubricating oil which may, where the motors are associated with vehicles, be derived from the pressure lubrication system of the vehicle. Various other fluids may, however, be used to provide the positive pressure for actuating the motors, and moreover in the broader aspects of the invention, suitable and hereinafter pointed out changes may be made in the present structures, adapting them to be operated by negative fluid pressures or suction, that is, by differential pressures represented by the difference between atmospheric pressure and a partial vacuum. Patent No. 1,731,048, granted to Holmes and the present applicant, discloses and generally claims the combination, in a vehicle windshield wiper system, of a fluid pressure motor disposed to be actuated by oil pressure derived from the vehicle lubrication system. In so far as the patented construction is concerned, the present invention is directed principally to improvements in the structural features of the fluid pressure motor.

Fig. 1 illustrates the general arrangement of the elements of an illustrative transmission system which may be used for transmitting mechanical movement from the present motor to a windshield wiper system. In this figure, the windshield wiper 50, which may be of conventional construction, is disposed for rotation about an axis adjacent the base of the vehicle windshield. The transmission mechanism provided to effect the oscillation of the wiper 50, includes a pair of flexible operating cables 52 (Fig. 3) which extend downwardly from the underside of the vehicle cowl 54, within sheaths 56, and terminate in opposed racks 58 and 60, which are in continuously meshing relation to an oscillating pinion 62. Pinion 62 is secured to the outer end of the shaft 64 of the motor, which is designated as a whole as 66. Motor 66, in turn, is adapted to be secured directly to the block of the engine 68. As described in more detail in the co-pending application, the racks 58 and 60 are retained in meshing relation to the pinion 62 by guide rollers 70 and 72 which are rotatably carried by the motor 66, and are connected to the cables 52 by lost motion connections, comprising the lugs 76 and 78. With this arrangement, oscillation of pinion 62, as hereinafter described, moves the racks 58 and 60 in respectively opposite directions. Each rack is thus effective to pull its associated cable, but, because of its lost motion connection therewith, is ineffective to apply a pushing force therethrough. The return movement of each cable is effected through the mechanism connected thereto adjacent the base of the windshield.

Referring now particularly to Figs. 2 through 7, the motor 66 comprises generally two castings 80 and 82, secured together in back-to-back relation by a plurality of studs 84, which pass through openings provided therefor adjacent the periphery of the outer casting 80, and are threaded into corresponding openings provided therefor in the inner casting 82. The inner casting 82, which is provided with a plurality of lugs 86, by which the motor as a whole may be secured to the block of the vehicle engine, or to any other suitable stationary supporting member, is formed to provide a generally semi-circular piston chamber 88, within which the vane 90 of the motor is oscillatably received. Casting 82 is also provided with a machined face 92 which is disposed to abut a correspondingly formed face provided on the engine 68. As hereinafter described, the face 92 is provided with a plurality of exhaust passages, which preferably extend directly through the wall of the engine block 68, into the crank case of the engine.

The outer casting 80 is provided with an under cut portion defined by the raised portions 94 and 96, within which under cut portion the previously mentioned guide rollers 70 and 72, the pinion 62, and the racks 58 and 60 are received. This under cut portion is adapted to be closed in the completely assembled condition of the parts by a cover plate 98. The rollers 70 and 72 are carried upon trunnions 100 and 102 individual thereto, which extend into recesses provided therefor in the casing 80. The cover plate 98 is secured in place by a plurality of studs 105 which are received in threaded openings 104 and 106 provided in bosses 108 and 110 which project slightly outwardly from the base of the under-cut portion.

The castings 80 and 82 are bored to rotatably receive and to provide a bearing for the shaft 64 of the motor, which is slotted to receive the vane 90, and which is provided with a reduced extension 114 to which the drive pinion 62 is secured. In order to prevent leakage around the shaft 64 and into the just mentioned undercut portion of casting 80, a packing gland 116 is interposed between casting 80 and the shoulder 120 of shaft 64. The shoulder is retained in continuous engagement with packing gland 116 by a compression spring 122 which is received in a recess 124 formed in the inner end of shaft 64. The outer end of spring 122 bears directly against the engine 68. In accordance with conventional practice, leakage around the vane 90 is minimized by packing members 126 and 128, which are secured to respectively opposite sides of the vane by rivets 130.

In addition to the above described elements, the motor 66 comprises a piston type shut-off valve 132, which is slidable in a passage 134 provided therefor in the casting 80, and a main reversing valve 136, also of the piston type, which is received in a passage 138 provided therefor in the upper portion of the casting 82. The shut-off valve 132 comprises an annular recess 140, defined by the two portions 142 and 144. The right hand end of valve 132, as viewed in Figure 4, is connected to a flexible control cable 146. The sheath 148 for the cable 146 is secured within a fitting 150, which in turn is tightly secured in a recess cut into the casting 80. Cable 146 extends, as shown in Figure 1, to the interior of the vehicle, and is provided with an operating button or handle 152. Valve 132 is shown in Figure 4 in the running position, in which the recess 140 registers with the supply passages. To stop the motor, the cable 146 may be pushed to move valve 132 to the left, bringing the portion 144 into registry with the just mentioned passages and closing them off.

The reversing valve 136 is provided with two annularly recessed portions 160 and 162, separated by an enlarged portion 164. Enlarged portions 166 and 168 are disposed adjacent the end of the valve. Valve 136 is provided with an axially extending bore 170, which receives a compression spring 172. Spring 172, the free end of which bears against the enclosed end of the chamber 138, continuously urges valve 136 from the position shown to the opposite extreme position, in which the stop 174 abuts the removable plug 176 which acts to enclose the end of the chamber 138. Movement of the valve 136 from the just mentioned limit position to the position shown in Figure 5 is accomplished by admitting fluid pressure into the chamber 138 between the end of the valve and the plug 176, as hereinafter described.

The various connecting passages, which supply fluid to the reversing valve to determine the direction of operation of the vane 90, and by which the reversing movements of the valve 136 are controlled by the position of the vane and by the shutoff valve 132, may best be understood in connection with a description of operation of the motor. Throughout the following description, only the active passages are given reference characters. Any passages not given reference characters are dead-end passages, closed by removable plugs, which are formed, as will be understood, as an incident to the formation of the active passages.

The reversing valve 136 is shown in Figure 5, in the position occupied thereby during the travel of the vane in a counter-clockwise direction to the limit position shown in Figure 5. The arrival of the vane 90 at the right hand limit position results in a reversing movement of the valve 136, but for purposes of clarity, the valve is illustrated as being in the position occupied thereby immediately prior to the reversal.

With valve 136 in the position shown in Figure 5, the fluid circuits for causing counter-clockwise movement of the vane 90 are as follows. Fluid is admitted under pressure to the left hand, or lower side of vane 90 by way of the passage 180, which directly connects with the intake nipple 182 of the motor, around the recess 160, and through passage 184 directly into the vane chamber 88. As will be appreciated, nipple 182 may be connected to a source of fluid pressure in a suitable way. The fluid circuit for exhausting fluid from the upper or right hand side of the vane 90 extends from the chamber 88, through the passage 186, around the recess 162, and through the exhaust passage 188 (Figure 6) into the vehicle crank case. As long as these two fluid circuits remain complete, as will be appreciated, vane 90 moves in the counter-clockwise direction, and ultimately reaches the position shown in Figure 5.

As vane 90 approaches the position shown in Figure 5, a fluid circuit is completed which exhausts the valve operating chamber 138 (between the end of the reversing valve 136 and the plug 176) permitting valve 136 to be moved to its extreme left hand position under the influence of the compression spring 172. This exhaust fluid circuit extends (Figures 7, 5, 4 and 6) from the chamber 138, through passage 190, connecting passage 192, passage 194, passage 196, radial shaft passage 198, axial shaft passage 200, and thence into the sump by way of the spring recess 124. The radial shaft passage 198 registers with the connecting passage 196 only upon the arrival of the vane 90 at the limit position shown in Figures 5 and 8 so that the just mentioned exhaust fluid circuit is completed only upon such arrival. Upon completion of the just traced fluid exhaust circuit, the fluid previously trapped in the chamber 138 is discharged therefrom, permitting the previously mentioned leftward movement of valve 136, under the influence of the compression spring 172, to the position shown in Fig. 8.

The movement of valve 136 from the position shown in Figure 5 to the position shown in Figure 8, disconnects the passage 184 from the inlet passage 180 and connects it to an exhaust passage 202 (Fig. 8) corresponding to the previously mentioned exhaust passage 188. Similarly, the valve movement disconnects the passage 186 from the exhaust and connects it to the inlet nipple 182. With the valve 136 in the position shown in Figure 8 accordingly, fluid circuits are completed which exhaust the lower or left hand side of vane 90 and which apply fluid pressure to the right hand or upper side of vane 90. The exhaust circuit extends from the chamber 88, through the passage 184, around the recess 160, and thence through the exhaust passage 202 to the sump. The fluid supply circuit extends from the intake passage 180, around the valve recess 162, and through the passage 186 into the chamber 88. These fluid circuits result in movement of vane 90 in a clockwise direction, as viewed in Figures 5, 8 and 9. The initial movement of the vane 90 from the limit position shown in Figure 5 to the position shown in Figure 8 interrupts the previously traced exhaust circuit for the valve chamber 138. This action is, however, without effect, as this chamber is now evacuated and valve 136 is retained in its left hand limit position under the influence of spring 172.

As the vane 90 approaches the left hand limit position, a fluid circuit is completed, by which fluid is admitted under pressure to the valve chamber 138, causing valve 136 to move to the position shown in Figures 5 and 9, against the force of the compression spring 172. This fluid circuit extends (Figures 6, 4, 7 and 5) from the intake nipple 182, through a transverse passage 204, a vertical passage 206, around the recess 140 of the shutoff valve 132, through the vertical passage 208, through a valve recess 210, cut in the motor shaft 64, and thence through the previously mentioned passages 196, 194, 192 and 190, into the valve chamber 138. The shaft recess 210 is so cut as to register with the passage 196 only when the vane 90 reaches the left hand limit position. Completion of the just traced fluid circuit supplies fluid under pressure to the chamber 138, causing a reverse movement of valve 136 as stated above.

The return movement of valve 136 to the position shown in Figures 5 and 9 recompletes the initially traced fluid supply and exhaust circuits for the chamber 88, causing a return movement of vane 90 in the counter-clockwise direction. The initial movement of the vane 90 from the left hand limit position to, for example, the position shown in Figure 9, moves the shaft valve recess 210 out of registry with the passage 196, interrupting the just traced fluid supply circuit for the valve chamber 138. Interruption of this fluid supply circuit, however, serves merely to trap the actuating fluid within the chamber 138, so that valve 138 remains in the right hand position until released, as above described, upon the arrival of the vane at the right hand limit of travel.

As long, accordingly, as the shut-off valve 132 remains in the running position (Fig. 4), the vane 90 of the motor 66 continuously reciprocates between the left hand and right hand limit positions thereof. At each arrival of the vane 90 at the right hand limit position, the valve chamber 138 is exhausted, permitting the valve 136 to be moved to the left hand limit position under the influence of the spring 172. On the other hand, each arrival of the vane 90 at the left hand limit of travel completes a fluid supply circuit for the valve chamber 138, resulting in a movement of the valve 136 to the right hand limit position against the influence of the compression spring 172.

Considering now the stopping of the motor, it will be appreciated that the shut-off valve 132 is associated only with the fluid supply circuit to the reversing valve chamber 138. A stopping movement of valve 132 thus serves only the purpose of preventing completion of a fluid pressure supply circuit for the valve 136. It may be assumed, for example, that shut-off valve 132 is moved from the position shown in Fig. 4 to the left to the stopping position during counter-clockwise movement of the vane 90. This shut-off movement has no effect other than to disconnect the passages 206 and 208 from each other, which, as previously described, are associated with the fluid pressure supply circuit for valve 136. Under the conditions mentioned, valve 136 occupies the position shown in Fig. 5, in which a quantity of fluid is trapped within the chamber 138. The fluid pressure supply circuit for chamber 138 is interrupted at the shaft passage 210, so that the additional interruption thereof by the valve 132 is without immediate effect. When the vane 90 reaches the limit position shown in Fig. 5, the previously traced exhaust circuit is completed for chamber 138, which circuit is independent of the shut-off valve 132 and the completion of which, accordingly, is not effected by the stopping movement of the valve 132.

Upon the arrival of the vane 90 at the left hand limit of travel, the fluid pressure supply circuit for chamber 138, normally, completed through the shaft passage 210, is now interrupted at the valve 132. This fluid pressure supply circuit being interrupted, the arrival of the vane 90 at the left hand limit of travel is not accompanied by a reversing movement of the valve 136, and the fluid pressure thus acts continuously to urge the vane 90 in the clockwise direction, forcibly but yieldingly retaining it at rest in the left hand limit position. It is believed to be evident that if the shut-off movement of valve 132 takes place during clockwise movement of vane 90, the stopping action is the same; that is, vane 90 is brought to rest at its left hand limit of position as a result of the failure of completion of a fluid pressure supply circuit for the reversing valve 136. It is seen, therefore, that the shut-off valve 132 may be operated at any point in the operating cycle of the motor to pre-condition the motor to be stopped upon its next arrival at its left hand limit position.

The starting operation of the motor is effected simply by throwing shut-off valve 132 to the running position shown in Fig. 4, which action immediately re-completes the fluid pressure supply circuit for the valve chamber 138, it being noted that at this time, the transverse shaft passage 210 is in registry with the cooperating passage 196. Completion of this circuit effects the normal reversal of the valve 136 and initiates a counter-clockwise operation of the vane 90.

In certain instances, it is found desirable to so arrange the motor that in normal operation, the vane 90 oscillates through a pre-determined angular range but, when stopped, occupies a position beyond this normal range. This alternative arrangement is readily embodied in the motor of the present invention simply by so forming the transverse shaft passage 210, which serves, as above described, to control completion of the valve fluid pressure circuit, as to permit completion of this circuit slightly before the vane 90 reaches its absolute left hand limit of travel. With this relation, the normal reversal at the left hand position occurs slightly in advance of the otherwise permissible leftward limit of the vane 90. When, however, the shut-off valve 132 is moved to the closed position, preventing completion of the fluid pressure reversing circuit through the passage 210, the vane 90 is moved under the influence of the fluid pressure to its extreme maximum limit position. In practicing this alternative construction, it is, of course, desirable to so form the transverse shaft passage 210 that it is in registry with the passage 196 not only at the normal reversing position of the vane but is also in registry therewith when the vane 90 occupies its maximum limit position. In all other respects, the construction and arrangement of the motor may be as specifically shown in the figures described above.

Referring further to Figs. 5 and 9, the motor is provided with secondary passages 212 and 214, which act to insure proper operation of the reversing valve 136 independently of any tendency of the actuating fluid to leak around the valve. The secondary passage 212 is formed in the valve 136, and extends through the enlarged portion 168 thereof, forming a connection between the valve chamber 138 and the valve recess 160. The passage 214 forms a connection between the chamber space between the right hand end of valve 136 and the sump. This passage extends through the inner wall 92 of the motor.

As is evident from Fig. 5, at any time that the reversing valve 136 occupies the right hand limit position shown, in which fluid under pressure occupies the chamber 138, the valve recess 160 is connected to the supply passage 180. Any tendency of the fluid trapped within the chamber 138 therefore to escape therefrom due to leakage or other causes, is prevented, since the bleeder passage 212 connects the chamber 138 to the supply passage 180, thus affording chamber 138 a supply of fluid to compensate for any such leakage.

As will be appreciated from Figs. 8 and 9, the chamber space at the right hand end of valve 136 is continuously in communication with the exhaust passage 214. Any tendency, therefore, for fluid leaking around the enlarged portion 166 to build up a pressure on the right hand end of valve 136 is overcome.

Figure 5a illustrates the adaptation of the construction of Figures 2 through 9 for suction operation instead of for positive fluid pressure operation. In this instance, the reversing valve 136a corresponds in all respects to the previously described valve 136 except that it is reversed in position. The compression spring 172a, received in the valve recess 170a, bears against the plug 176, and thus continually urges the valve to the right instead of to the left as previously described. Also, the bleeder passage 212 of Figure 5 is replaced by a passage 212a which connects the recessed portion 162 with the valve bore 170a, and consequently with the valve chamber space 138. In all other respects the construction and arrangement of parts may be as described in detail with reference to Figures 2 through 9 (as indicated by the use of corresponding reference characters), it being understood, of course, that the inlet 182 is connected to a source of suction, instead of fluid pressure, and that all exhaust passages are connected to atmosphere.

As to operation, the parts are shown in Fig. 5a, in positions corresponding to rightward travel of vane 90, vane 90 being in its limit position and in readiness to effect a reversing movement of valve 136a. It will be recalled from the description of Figures 2 through 9 that the arrival of vane 90 at its right hand limit of travel connects the valve chamber 138 to the sump through the axial shaft passage 200 (Fig. 6). In this case this connection results in connecting chamber 138 to atmosphere. This connection either partially or entirely balances the atmospheric pressure acting on the right hand end of valve 136a (through passage 214, Fig. 8), and renders spring 170a effective to force valve 136a to its right hand limit position.

In the just stated right hand limit position of valve 136a, the chamber space at the left hand side of vane 90 is connected to suction, and chamber space at the right hand side of vane 90 is connected to atmosphere. The suction circuit includes the inlet passages 182 and 180, the valve recess 160 and passage 184. The atmospheric circuit includes passage 186, the valve recess 162 and passage 188, which latter passage is more clearly shown in Figure 8. During completion of these circuits, accordingly, vane 90 is acted upon by a pressure differential which causes it to move in a clockwise direction, or to the left.

As vane 90 approaches its left hand limit of travel, as previously described, the valve chamber 138 is connected to the inlet 182, or, in this case, to suction, through the fluid circuit which includes the shaft valve recess 210 (Fig. 4). Upon completion of this circuit, chamber 138 is partially evacuated, rendering the atmospheric pressure acting on the right hand end of valve 136a effective to force the valve to the left against the force of spring 172a. This valve movement, as will be appreciated, reverses the suction and atmospheric connections to the vane chamber, resulting in counter-clockwise or rightward movement of vane 90.

As long as the cut-off valve 132 (not shown in Fig. 5a) remains in running position, valve 90 continuously reciprocates as in the case of the positive pressure operated motor of Figures 2 through 9. It is believed to be evident that if it is desired to stop the motor, the cut-off valve 132 may be operated to prevent the connection of chamber 138 to suction and to, accordingly, prevent a rightward reversing movement thereof upon the arrival of vane 90 at its right hand limit of travel. The motor thus parks as in the previous embodiment, except that in this case the parking position is at the right hand position instead of at the left hand limit position.

As described in connection with Figures 2 through 9, during the period that chamber 138 is intended to be partially evacuated, it is desirable to arrange the structure to prevent the building up of a pressure within this chamber; and during the time chamber 138 is intended to be under pressure, it is desirable to prevent a dissipation of this pressure. This is accomplished in Figure 5a by bleeder passage 212a which extends through the wall of valve 136a and connects chamber 138 to recess 162. Thus, movement of valve 136a to the position shown in Fig. 5a, which results from partially evacuating chamber 138, connects this chamber to suction through bleeder passage 212a. On the other hand, movement of valve 136a to its right hand position, which results from applying atmospheric pressure to chamber 138, connects this chamber to atmosphere through the bleeder passage 212a.

Figure 12:
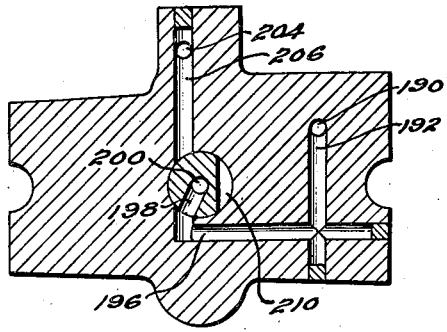
Fig. 12 is a view in vertical section, taken along the line 12—12 of Fig. 10.
Figure 10:
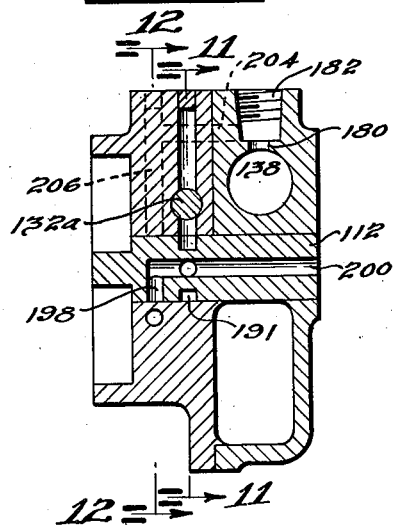
Fig. 10 is a view in vertical axial section of a modification of the motor shown in Figs. 1 through 9.

Referring to Figs. 10, 11 and 12, an embodiment of the invention is shown in which the stopping of the motor in a selected or "parked" position is effected by completing an auxiliary exhaust circuit for the chamber associated with the reversing valve, instead of by interrupting the normal fluid pressure supply circuit therefor, as in the case of the motor of Figs. 2 through 9. Except insofar as concerns the shut-off mechanism, the structure of Figs. 10, 11 and 12 may be and preferably is the same as described in connection with Figs. 2 through 9. Accordingly, corresponding reference characters are used so far as applicable.

In Figs. 10, 11 and 12 the normal fluid supply circuit for the chamber 138 associated with the reversing valve 136 extends from the inlet nipple 182 through passages 204 and 206 to the shaft recess 210 and thence through passages 196, 192 and 190 into the valve chamber as previously described. It will be recalled that recess 210 registers with passage 206 only when the motor vane reaches its lefthand limit of travel. The normal fluid exhaust circuit for the valve chamber 138 extends through the passages 190, 192 and 196 and thence through the radial shaft passage 198 into axial shaft passage 200 to exhaust. These circuits duplicate those described with reference to Figs. 2 through 9 except that the fluid supply circuit is not subject to the cut-off valve 132.

In the embodiment now being described an auxiliary circuit extending from the chamber 138 to exhaust is provided, which auxiliary circuit is subject to the shut-off valve 132a. This exhaust circuit extends from the chamber 138 through a transverse passage 199, a passage 197, vertical passage 195 to the valve 132a. From this point the circuit extends through a vertical passage 193 into an annular recess 191 provided on the shaft 64. Recess 191 communicates through a second radial shaft passage 189 which connects into the axial shaft passage 200 and thus returns to the sump. With the shut-off valve 132a in the running position shown in Fig. 11 the just traced auxiliary exhaust circuit is interrupted and, therefore, the reversing valve 136 is controlled by the main supply and exhaust circuits in the manner described with reference to Figs. 2 through 9. In the event it is desired to bring the motor to rest, the valve 132a may be moved to the right from the position shown in Fig. 11 to a position in which the annular recess 187 is into registry with the passages 195 and 193. This action immediately completes a fluid exhaust circuit for the reversing valve chamber 138 permitting it to be moved to its lefthand limit position (Fig. 5) under the influence of the compression spring 172. In this position of the reversing valve, the vane 90 is continuously urged toward its lefthand limit position. Accordingly, independently of the position in the cycle of operation to which the shut-off valve 132a is operated the vane 90 is caused to immediately move to and stop at its lefthand limit.

As further described in connection with Figs. 2 through 9, depending upon the positioning of the recess 210 which controls the supply circuit for chamber 138, the parking position may either correspond to or be beyond the normal lefthand limit of travel of the vane 90.

Figure 13:
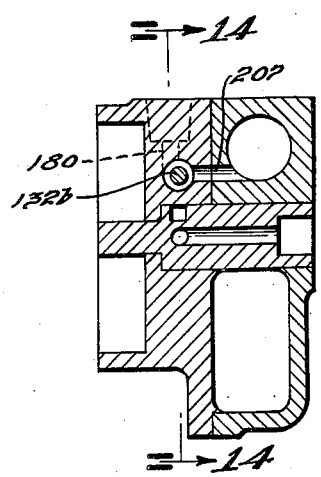
Fig. 13 is a view in vertical section of a further modification of the motor shown in Figs. 1 through 9.
Figure 14:
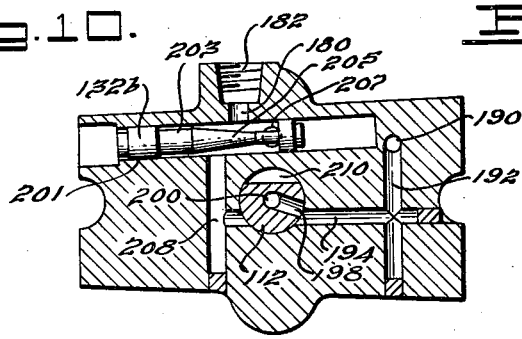
Fig. 14 is a view in vertical section, taken along the line 14—14 of Fig. 13.

Referring to Figs. 13 and 14, an embodiment of the invention is shown in which the shut-off valve 132 described with reference to Figs. 2 through 9 may also be arranged to selectively change the operating speed of the motor, as well as to control the automatic stopping of the motor at a predetermined limit position. In all respects excepting the feature of modifying the motor operating speed, the construction of the motor on Figs. 13 and 14 may be and preferably is as described with reference to Figs. 2 through 9 and, accordingly, corresponding reference characters are used except as to the distinguishing features.

In Figs. 13 and 14, the shut-off valve 132b is provided with a land 201 which corresponds to the land 144 on valve 132 (Fig. 4) and which, upon movement of valve 132b to its extreme righthand position, blocks off the passage 208 which is associated with the circuit for supplying fluid pressure to the reversing valve chamber 138 (Fig. 5). Valve 132b is provided with an annular recessed portion 203, which, upon slight movement of valve 132 to the left as viewed in Fig. 14, registers with the passage 208, and serves to permit completion of a fluid pressure supply circuit for the reversing valve chamber 138. Valve 132b is also provided with a tapered portion 205 which, in accordance with the position of valve 132b, serves to restrict or enlarge the flow of fluid from the inlet 182 through the main supply passage 207, which leads through the reversing valve to the vane chamber. Valve 132b is shown in Fig. 14 in its extreme lefthand position, in which the land 201 is out of registry with the valve passage 208 permitting a normal reversing action thereof at the limit of travel as described in connection with Figs. 2 through 9; and in which the tapered portion 205 is so disposed as to permit a maximum flow of fluid through the inlet 182 around the tapered portion and thence through transverse passage 207 to the reversing valve and the vane chamber. With this positioning of the parts, accordingly, a maximum operating speed of the motor results. Movement to the right of valve 132b from the position shown in Fig. 14, restricts the effective area of the valve passage leading to the passage 207, correspondingly reducing the rate of supply of fluid to the motor vane and effecting a reduction in the speed thereof. Movement of the valve 132b to its extreme righthand position substantially interrupts the flow of fluid through the main piston passage 207, and also moves the land 201 into blocking relation to the valve passage 208. The remainder of the operating stroke of the motor thus occurs at a relatively slow rate and the motor is brought to rest upon the next arrival thereof at the lefthand limit position, as described in connection with Figs. 2 through 9.

Figs. 15 to 21 disclose the invention as embodied in a motor of the piston type. In this embodiment, the motor is formed of a main casting member 240, which is bored to provide a piston chamber 244 and a valve chamber 246. A closure plate 242 is secured to member 240 to enclose the otherwise open end of chambers 244 and 246. The chamber 244 slidably receives a piston 248, which may be of conventional construction, and which is rigidly secured to a piston rod 250. The free end of rod 250 extends outwardly of the casting 240 and may be connected to the apparatus to be operated by the motor in any suitable way. The previously identified co-pending application of the present applicant discloses several preferred embodiments for translating the reciprocating motion of the piston rod 250 into alternate reciprocatory movements of a pair of flexible operating cables, such, for example, as the cables 52 described with reference to the preceding figures.

The chamber 246 houses a piston type valve 252 which functions to reverse the fluid pressure supply and exhaust connections to the portions of chamber 244 on opposite sides of the piston 248, by way of the passages hereinafter described. Valve 252 is provided with portions 254, 256 and 258, which serve to separate and define annular recessed portions 260, 262 and 264.

Recesses 260 and 262 are associated with the reversing connections for the piston chamber 244. The recess 264 is associated with the reversing movements of the valve 252, and forms, with the passage 246, a chamber 265 within which a fluid pressure may be built up to move valve 252 to the left of the position shown in Fig. 16, against the force of a compression spring 266. Spring 266 is associated with valve 252 in the manner described with reference to the first embodiment.

The admission to and the exhaustion from the just identified chamber 265 of fluid pressure is selectively controlled by a valve portion 268, of reduced radius, formed in the piston rod 250, and which cooperates with suitable supply and exhaust passages at the respectively opposite limits of travel of the piston 248, in the manner more particularly described hereinafter.

The various passages formed in the motor casing, which are selectively opened and closed by the valve 252 to control the piston 248, and which are selectively opened and closed by the piston rod 250 to in turn control the valve 252 may best be described in connection with a description of operation of the motor. As in the previous embodiments, note is here made that only the active passages are given reference characters in the following description. Any passages not given reference characters may be regarded as dead-end passages closed by suitable removable plugs, and which are formed during manufacture as an incident to the formation of the active passages.

The parts are shown in Fig. 16 with the piston 248 in its lefthand limit position, and with valve 252 in the righthand limit position, to which position valve 252 is automatically moved upon the arrival of piston 248 to the illustrated limit position. The parts are thus in readiness for the beginning of a rightward movement of piston 248. With the parts in the particular positions shown in Fig. 16, the position of valve 252 is controlled entirely by the compression spring 266, since an exhaust circuit is provided for the valve chamber 265. This exhaust circuit (Figs. 16 and 18) extends from chamber 265 through a passage 270, a connecting passage 272, passage 274, around the reduced portion 268 of piston rod 250 which is now in registry with the passage 274, and thence through connecting passages 276 and 278 to the sump. It is noted that passage 278 opens to the exterior face 280 of the motor which face 280 is preferably machined to provide a plane surface along which the motor is secured to a suitable stationary support, which may, in the case of a vehicle windshield wiper system, be the block of the vehicle engine. The face 280 is enlarged and openings 282 extend therethrough, to receive mounting studs or the like. The just traced exhaust circuit releases any fluid previously trapped within the chamber 265, permitting spring 266 to move valve 252 to the right hand limit position and retain it there until the completion of a fluid supply circiut for chamber 265, which occurs when the piston 248 reaches its opposite limit of travel as described below.

With the parts in the position shown in Fig. 16 a fluid supply circuit is provided for the chamber space to the left of piston 248 and a fluid exhaust circuit is provided for the chamber space to the right of piston 248. The fluid pressure supply circuit extends (Figs. 20, 19 and 16) from the inlet opening 284, through passage 286, a horizontal connecting passage 288, transverse passage 290, and into the valve space around the reduced portion 260 of valve 252. From this point, the circuit extends through a transverse passage 292, a longitudinal passage 294, and thence through a short vertical passage 296 into the chamber space on the lefthand side of piston 248. The corresponding fluid exhaust circuit extends from the chamber space on the righthand side of piston 248 through connecting passages 298 and 300 into the space around the reduced portion 262 of valve 252, from which portion the circuit extends to the sump by way of the exhaust passage 302 which extends through the previously identified inner wall 280 of the motor.

As long as the just traced fluid pressure supply and exhaust circuits remain complete accordingly, piston 248 is caused to move to the right as viewed in Fig. 16. The initial rightward movement of piston 248 moves the reduced portion 268 of piston rod 250 out of registry with the previously identified exhaust passage 274, interrupting the exhaust circuit for the valve chamber 265. This action is, however, without effect since valve 252 is now retained in its righthand position under the influence of spring 266.

When piston 248 reaches its righthand limit of travel, valve 252 is automatically moved to the lefthand position, which action reverses the connections to the piston chamber 244 and initiates a leftward movement of piston 248. The parts are shown in Fig. 21 with piston 248 in its righthand limit position and with valve 252 in the position to which it is moved upon the arrival of piston 248 at such righthand limit. The fluid circuits involved are as follows:

The arrival of piston 248 at its righthand limit of travel brings the reduced portion 268 of piston rod 250 into registry with a vertical passage 304 which connects into the previously identified passage 270. This action completes a fluid pressure supply circuit which extends (Figs. 20 and 16) from the inlet opening 284, around the reduced portion 268 of piston rod 250 and thence through passages 304 and 270 into the previously identified valve chamber 265. Completion of this circuit admits fluid under pressure to the chamber 265, which accordingly builds up a pressure therein and forces valve 252 to the left against the force of the compression spring 266. With valve 252 in the position shown in Fig. 21, a fluid pressure supply circuit is completed for the portion of chamber 244 on the right hand side of piston 248 and an exhaust circuit is provided for the portion of chamber 244 on the lefthand side of piston 248. The fluid pressure supply circuit extends (Figs. 20, 19 and 16) from the inlet opening 284, through passages 286, 288 and 290 into the chamber space around the reduced portion 262 of valve 252. From this point the circuit extends through the previously identified passages 298 and 300 into chamber 244. The fluid exhaust circuit extends from the portion of chamber 244 on the lefthand side of piston 248 through the previously identified passages 296, 294 and 292 into the chamber space around the reduced portion 260 of valve 252. From this point the fluid is discharged by way of the exhaust passage 306, which passes through the inner wall 280 of the motor.

As long as the just traced fluid pressure supply and exhaust circuits remain complete accordingly, piston 248 is caused to move to the left. The initial leftward movement of piston 248 moves the reduced portion 268 of piston rod 250 out of registry with the valve supply passage 304 interrupting the previously traced fluid pressure supply circuit for the valve chamber 265. This action, however, serves merely to trap the previously admitted fluid within the chamber 265, and has no effect upon the position of valve 252.

When piston 248 reaches the lefthand limit position shown in Fig. 16, the previously traced exhaust circuit for chamber 265 is again completed by the movement of the valve portion 268 of piston rod 250 into registry with the exhaust passage 274. Completion of this exhaust circuit permits valve 252 to be moved to the righthand limit position under the influence of spring 266, re-completing the initially traced supply and exhaust circuits for chamber 244, and initiating a rightward movement of piston 248. As long, accordingly, as the inlet passage 284 is supplied with fluid under pressure, the piston 248 continuously reciprocates, valve 252 automatically responding to the arrival thereof at the limit positions. The valve movement at one limit position is effected by the application to the valve of fluid pressure, and the valve movement at the other limit position is effected by spring pressure rendered effective by the exhaustion of the just stated fluid pressure.

As in the previously described embodiments, the motor of Figs. 15 through 21 includes special provision to insure proper valve operation under all conditions. It is noted that the portion of the valve chamber 246 between the lefthand end of valve 252 and the end of the chamber is continually connected to the sump by way of a relief passage 308. Passage 308 thus effectively prevents the building up of a fluid pressure within such valve chamber portion which pressure, unless relieved, might oppose the leftward movement of valve 252. Similarly, a bleeder passage 310 extends from reduced portion 262 into passage 311 which communicates with chamber 265. As long as valve 252 occupies the position shown in Fig. 16, the valve chamber 265 is thus connected directly to the exhaust port 302 by way of the bleeder passage 310, thus preventing any premature building up of a pressure within chamber 265 which would otherwise tend to cause a premature operation of the vlave. On the other hand, when valve 252 is in its lefthand limit position as shown in Fig. 21, the valve chamber 265 is connected through the bleeder passage 310 to the supply passages 290, 288 and 286. Thus, any leakage from the chamber 265, occurring for example around the piston rod 250 by way of passages 270, 272 and 274, is compensated for by a continuous supply of fluid through the bleeder passage 310. This continuous supply effectively prevents a premature loss of pressure in the chamber 265, and accordingly prevents a premature movement of valve 252 to the right under the influence of the spring 266.

In the foregoing description, the supply passage 284 has been considered as continuously open, resulting in a continuous operation of the motor. In instances where it is desired to arrange the motor so that it may be stopped at any point in its operating cycle, a cut-off valve 312 may be interposed in the line 314 leading to the inlet 284. With this arrangement, closure of valve 312 immediately interrupts the supply of fluid pressure to the piston 248, bringing it to rest immediately.

Alternatively, if it is desired to cause each stopping operation of the motor to occur at a selected point, as for example, when the motor is used in connection with a vehicle windshield wiper system, the arrangement of Fig. 22 may be used. In Fig. 22, which corresponds generally to Fig. 20, a shut-off or parking valve 316 is interposed between the inlet 284a and the previously identified piston rod 250a. With this arrangement, valve 316, which may correspond in all respects to the shut-off or parking valve 132 described with reference to the first embodiment, selectively completes or interrupts the previously traced fluid pressure supply circuit for the valve chamber 265. This action, as described in connection with the first embodiment does not interfere in any way with the completion of the exhaust circuit for chamber 265, so that the normal reversing movement of valve 252 occurs at the lefthand limit of travel of piston 248. The normal reversing movement of valve 252 when piston 248 reaches its righthand limit of travel, however, is prevented since no fluid pressure supply circuit is completed for chamber 265. Valve 252, therefore, remains in the position shown in Fig. 16 and the fluid pressure acts continuously to urge piston 248 to the right. As also described in connection with the first embodiment, the passage 304 which cooperates with the reduced portion 268 on piston rod 250 to complete the just mentioned fluid supply circuit for chamber 265, may be so positioned that it completes this circuit somewhat in advance of the arrival of piston 248 at its mechanical limit of travel. In this instance, when the parking valve 316 is moved to the stopping position, the rightward movement of piston 248 continues to a point beyond the normal limit position, affording an extra parking movement in the case of a windshield wiper system. In all other respects, the motor indicated in Fig. 22 may be constructed and arranged as described with reference to Figs. 15 through 21.

Referring now to Figs. 23 through 35, the invention is shown as embodied in a piston type motor of the single acting type, that is, a motor in which the movement of the piston in one direction is effected by the application thereto of fluid pressure; and the movement of the piston in the other direction is effected by exhausting the fluid pressure and applying to the piston the force of a compression spring which may be and preferably is loaded during the power stroke. In this instance, as in the previous instances, the application to and exhaustion from the piston chamber of the fluid pressure is controlled by a reversing valve of the type which is actuated in one direction by fluid pressure and is actuated in the other direction by a return spring. The movements of the reversing valve are selectively controlled in accordance with the position of the piston rod.

The motor designated as a whole as 330 comprises generally a main casting 332 which is formed to provide a piston chamber 334, as well as the hereinafter described valve chambers; and a second casting 336, which is threadably secured to casting 332 and forms a closure for the otherwise open ended piston chamber 334. Member 336 is also formed to provide a spring retaining sleeve 338. The end of sleeve 338 is closed by a cover 340, which is adjustable to effect a corresponding adjustment of the main return spring 342. As most clearly appears in Fig. 26, one end of the return spring 342 bears against the cover 340, and the other end is seated over a boss 344, which is carried by the main motor piston 346.

Piston 346, which is conventionally slidably received within the chamber 334 is rigidly secured to the piston rod 348, which extends longitudinally through the casting 332, and is connected at its outer end to a suitable transmission element represented as a flexible cable or Bowden wire 350. A nipple 352 is threaded into the end of the piston rod passage to close the same, and is provided with a split outer end 354 which acts as a retainer for the sheath 356 provided for cable 350. A tightening nut 358 is threaded over the split portion 354 to restrict the same and bind the sheath 356 in the split portion.

The piston rod 348 is provided with a somewhat elongated annular recessed portion 360 which functions as hereinafter described to selectively control the admission to and exhaustion from the valve chamber of fluid pressure, to thereby control the movements of the main reversing valve 362. Piston rod 348 is provided with a second recessed portion 364 which functions as hereinafter described to exhaust the reversing valve chamber.

The main reversing valve 362 is slidably received in a passage 366 provided therefor in the casting 332, and is movable to the position illustrated in Figs. 25 and 29 by the introduction of fluid pressure into the chamber space 368. A compression spring 370, which is received in a recess 372 provided therefor in valve 362, and one end of which bears directly against the wall 374 of casting 332, continuously urges the valve 362 to the right of the position shown in Figs. 25 and 29. Leftward movement of the valve 362 is limited by the engagement of the lefthand end with the just mentioned wall 374, and rightward movement thereof is limited by the engagement of the righthand end of the valve with a stop 376 which is either suitably secured to or formed integrally with a plug 378 which closes the end of the valve housing 366. Reversing valve 362 is provided with an annular recessed portion 380, which as hereinafter described controls the admission to and exhaustion of fluid pressure from the main piston chamber 334.

The starting of the motor 330 and the stopping thereof at a selected limit position is controlled by cut-off valve 382, which is slidably received in a passage provided therefor in the casting 332, and is provided with an annular recessed portion 384, which as hereinafter described controls the admission of fluid pressure to the reversing valve chamber 368. The shank 386 of valve 382 extends outwardly of the casting 332, and is suitably connected to a control cable 388 which may and preferably is of the flexible or Bowden wire type. The sheath 390 for the cable 388 is secured in a split nipple 392, associated with a main nipple 394, in the manner described in connection with the sheath 356 associated with the main operating cable 350.

The base of motor 330 is provided with oppositely disposed attaching bosses 396, by which it may be connected to a suitable stationary support which, in the case of windshield wiper systems, is preferably the engine of the vehicle. The base of motor 330, as most clearly appears in Fig. 27, is provided with recessed or undercut portions 400, into which the hereinafter described exhaust passages open, and which recesses may be in communication with a suitable sump. An inlet boss 402 is also formed adjacent the face of the motor, and accommodates the main inlet passage 404, which may be connected in any suitable way to a suitable source of fluid pressure.

The various passages which are formed in the motor to accommodate the circulation of fluid to the piston chamber, and to the valve chamber, may best be described in connection with a description of operation of the motor as a whole. In the following description, only the active fluid passages are given reference characters, those passages not given reference characters being dead end passages, closed by suitable plugs, and which are formed as an incident to the manufacture of the active passages.

As a preliminary to the detailed description of operation, it is noted that the two views of Figs. 36 and 37 clearly show in diagrammatic form the operating and valve passages which are completed at the end of the return and power strokes respectively. The various passages in Figs. 36 and 37 are given the same reference characters as the corresponding passages in the detail figures and the following description may be read either in connection with Figs. 36 and 37, or in connection with the figures identified in parenthesis in the description.

The parts are shown in Figs. 23 through 35 in positions of readiness for the beginning of a power stroke. That is, the motor piston 346 is in its righthand limit position, to which it is urged by the main return spring 342, and the reversing valve 362 is shown in its lefthand limit position, to which position it is automatically moved upon the arrival of the piston 346 at the righthand limit of travel. With the parts in these positions, a fluid supply circuit is completed between the previously mentioned inlet 404 and the valve operating chamber 368. This circuit extends (Figs. 25, 27, 28, 29, 31, 33 and 34) from the inlet 404 around the recess of the shut-off valve 382, through a vertical passage 410, a longitudinal passage 412, a transverse passage 414 and thence into the space around the recess 360 of the piston rod 348. From this point the circuit extends along the recess 360 and thence through a vertical passage 416 into the chamber 368. This circuit is completed as will be appreciated, when the piston rod recess 360 exposes passage 416 which occurs at the end of the return stroke or at the arrival of the piston 346 at the position shown in the drawings. Upon completion of this circuit the thus admitted fluid builds up a pressure within the valve chamber 368, forcing it to the position shown in the various figures, against the force of the compression spring 370 associated therewith.

Movement of the reversing valve 362 to its lefthand limit position as just described completes a fluid circuit extending from the inlet 404 to the piston chamber 334 at the righthand side of piston 346. This fluid circuit extends (Figs. 29 and 31) from the inlet 404 through a transverse passage 420 into the space around the reversing valve recess 380 and thence through a supply passage 422 into the portion of chamber 334 which is on the righthand side of piston 346. In response to completion of this circuit, a fluid pressure is built up in the just mentioned chamber space, which serves to force piston 346 to the left as viewed in the various figures, against the force of the main return spring 342.

The initial leftward movement of piston 346 moves the piston rod recess 360 out of registry with the vertical passage 416 (Fig. 34), thereby interrupting the previously traced fluid supply circuit for the valve chamber 368, and trapping the fluid within this chamber. Valve 362 accordingly remains in its left-hand limit position.

A feature of the present construction is the provision of secondary passages which, during the leftward movement of piston 346, serve to connect valve chamber 368 to the source of supply in order to replace any of the fluid which may have leaked therefrom, and overcome any otherwise possible tendency for valve 362 to move to the right prior to the end of the power stroke. One of these secondary fluid supply circuits extends (Figs. 25, 27, 28, 29, 31 and 32) from the inlet 404, through the cut-off valve recess 384, vertical passage 410, longitudinal passage 412, and transverse passage 424 into the piston rod recess 360, which is now in registry with passage 424. From this point the circuit extends through transverse passage 426, longitudinal passage 428, and vertical passage 430 into the valve chamber 368. It is noted with reference particularly to Fig. 33, that the vertical passage 430 is closed as long as reversing valve 362 occupies its righthand position, but is exposed by the previously described movement thereof of the valve to the lefthand limit position. During completion of the just traced circuit accordingly, valve chamber 368 is connected to the source of supply and any leakage from the valve chamber 368 is replaced.

The second of the just mentioned secondary circuits extends (Figs. 25, 27, 28, 29, 31, 32 and 33) from the inlet 404 through the cut-off valve recess 384, vertical passage 410, and transverse passage 432 to the recess 360 of the piston rod 348, which latter element is now in registry with passage 432. From this point the secondary circuit extends through transverse passage 434 into the previously mentioned longitudinal passage 428 and thence through vertical passage 430 into the valve chamber 368. During completion of this circuit accordingly, any leakage is again replaced. Recess 360 is so proportioned as to overlap passages 424 and 432, so that 432 will be uncovered before passage 424 is covered, thus ensuring that fluid will be delivered to passages 428 and 430 at all times except when recess 360 occupies a position to the left of passage 432 or to the right of passage 424. Recess 360 registers with passage 424 very shortly after the beginning of a power stroke and does not move out of registry with passage 432 until just prior to the completion of the power stroke.

As the piston 346 approaches its extreme lefthand position, the reduced portion 364 of piston rod 348 (Fig. 26) passes beyond and exposes the valve chamber exhaust passage 436 (Fig. 35), completing an exhaust circuit for the valve chamber 368. This circuit extends (Figs. 25, 29, and 35) from the valve chamber 368 through the previously mentioned vertical passage 416 into the space around the reduced portion 364 of piston rod 348 which is now in registry with this passage. From this point the circuit extends directly through the exhaust passage 436 to the sump or other collecting point. Upon completion of the just traced exhaust circuit, the compression spring 370 (Fig. 25) is rendered effective to force the reversing valve 362 to the right, to its righthand limit position in engagement with the stop 376.

The just mentioned movement of the reversing valve 362 to its righthand limit position interrupts the previously traced supply circuit for the piston chamber 334, and completes an exhaust circuit therefor, which circuit extends (Figs. 25 and 32) from the chamber 334 through the passage 422 and into the reversing valve recess 380. From this point the circuit extends directly through the exhaust passage 438 into the sump. It will be appreciated that with valve 362 in the righthand limit position, the previously mentioned supply passage 420 (Fig. 31) is closed off by the valve.

Completion of the just traced exhaust circuit for the chamber 334 renders the main return spring 342 effective to force piston 346 to the right through the return stroke thereof, which return stroke is interrupted by the engagement of the piston 346 with the mechanical stop 440 provided therefor in the piston chamber 334; or alternatively, it may be interrupted slightly prior to this engagement by the automatic movement of the reversing valve 362 to its lefthand position as described below. The initial rightward movement of piston 346 moves the reduced portion 364 of piston rod 348 (Fig. 26) out of registry with the exhaust passage 436, interrupting the previously traced exhaust circuit for the reversing valve 362. Valve 362 is, however, now in its righthand limit position so that the interruption of this circuit is without effect. As the rightward movement of piston 346 progresses, the reduced portion 360 of piston rod 348 is successively brought into and out of registry with the previously mentioned secondary passages 432 and 424, tending to cause completion of the previously traced secondary fluid supply circuits for the valve chamber 368. Completion of these circuits is, however, prevented since the vertical passage 430 (Fig. 33) associated with the secondary circuits is now closed off by the enlarged portion 442 of the reversing valve 362. The secondary circuits are, therefore, effective only during a power stroke of the motor, or during a stroke in which the valve 362 is in its lefthand limit position.

As piston 346 approaches the righthand limit of its stroke, the recess 360 of piston rod 348 is again brought into registry with and opens the valve supply passage 416 (Fig. 34), thereby recompleting the initially traced fluid pressure supply circuit for the valve chamber 368. For convenience, this supply circuit is repeated as follows: Figs. 27, 28, 31, 33 and 34 from the inlet 404 around the shut-off valve recess 384, passages 410, 412, 414 into the piston rod recess 360, and thence through the vertical passage 416 into the valve chamber 368. Upon completion of this circuit, a fluid pressure is built up within the chamber 368, which forces valve 362 to the left against the force of the compression spring 370. This movement of reversing valve 362 closes off the previously mentioned piston chamber exhaust port 438 (Fig. 32) and re-opens the piston chamber supply port 420 (Fig. 31). This latter action re-completes the above traced fluid pressure supply circuit for the piston chamber 334, initiating a leftward movement of the piston 346 in the previously described manner.

As long, accordingly, as the shut-off valve 382 remains in the running position shown in Fig. 27, the piston 346 continuously reciprocates, the leftward movement thereof, or the power stroke thereof, being effected by the application of fluid pressure to piston 346, and the return stroke thereof being effected by the force applied thereto by the main return spring 342. During this operation of the piston also, reversing valve 362 occupies its lefthand limit position during each power stroke and is returned to its righthand position by the return spring 370 at the conclusion of each power stroke. The conclusion of each power stroke also completes an exhaust circuit for the valve chamber 368 and the conclusion of each return stroke completes a supply circuit for the valve chamber 368.

Considering now the stopping action of the motor of Figs. 23 through 35, it is believed to be evident from Fig. 27 and Fig. 31 that the shut-off valve 382 functions only to directly control the fluid pressure supply circuit for the valve chamber 368, and is not directly associated with the supply or exhaust circuits for the main piston chamber 334. It is believed to be evident also that a movement of the shut-off valve 382 to left as viewed in Fig. 27, brings the enlarged portion 444 thereof into registry with and closes off the passage 410 (Fig. 31) leading to the valve chamber 368. The shut-off valve 382 may, therefore, be operated at any point in the power or return stroke of motor 330 without other immediate effect than to prevent completion, at the conclusion of the next return stroke, of a fluid pressure supply circuit for the valve chamber 368. This fluid pressure supply circuit being interrupted, the reversing valve 362 remains in its righthand position after the arrival of piston 346 at its normal lefthand limit and a reversal of the motor, therefore, does not result. In the stopped position, also, the piston 346 is continuously acted upon by the return spring 342 and is thus resiliently retained thereby in its stopped position.

As will be appreciated, if the normal completion of a fluid pressure supply circuit for the valve chamber 368 occurs simultaneously with the arrival of the piston 346 at the mechanical stop 440 provided therefor (Fig. 26), such stop 440 will serve to bring the piston 346 to rest at the same point at which its reversal normally occurs during continuous operation of the motor.

In certain instances, as described in connection with the earlier embodiments, particularly where the approved motor is used to drive a windshield wiper mechanism, it is desirable to bring the motor to rest with the piston thereof at a position beyond the normal limit of its movements. To accomplish this in accordance with the present construction it is only necessary to so proportion the parts that the fluid pressure supply circuit for the valve chamber 368 is completed at a time when the piston 346 is still in predetermined spaced relation to the mechanical stop 440; that is, to so proportion the parts that the piston rod recess 360 exposes the valve chamber supply passage 416 (Fig. 34) a predetermined time before piston 346 reaches the mechanical stop 440. With this proportioning, the normal reversal of movement of piston 346 will occur at a point spaced from the stop 440. If the shut-off valve 382, however, is moved to the stopping position, preventing completion of the fluid pressure supply circuit for the valve chamber 368, no interruption in the movement of the piston 346 will occur upon the exposure of the supply passage 416. On the contrary, the piston movement will continue beyond its normal limit and will be stopped when piston 346 engages the mechanical stop 440.

In addition to the previously mentioned secondary passages 424 and 432, etc. (Fig. 23) which serve to prevent a premature movement to the right of reversing valve 362 as a consequence of any leakage which may occur in the piston, the present invention also provides additional secondary fluid exhaust circuits to prevent faulty operation of piston 346, as well as to prevent faulty operation of the reversing valve 362. Referring, particularly to Fig. 28, an exhaust opening 450 is provided in the chamber 334 adjacent the lefthand end thereof, which leads directly into the sump or other collecting vessel, and prevents the building up of a pressure within chamber 334 to the left of piston 346 as a consequence of any leakage which may occur around the piston 346. Similarly, as clearly appears in Fig. 25, an exhaust passage 452 leads from the chamber space at the lefthand end of reversing valve 362, through which any fluid which may leak around the enlarged portion 454 thereof may escape, thus avoiding any possibility of building up of pressure upon such lefthand end of the valve which would interfere with proper operation thereof.

A bleeder hole 460, of relatively small area, is formed in the head of valve 362 to provide a continuously open passage from chamber 368 to the sump, by way of the spring recess 372 and outlet 452. The purpose of this bleeder passage is to prevent the building up of pressure in chamber 368 during the return or rightward stroke of piston 346, by leakage from any of the high pressure fluid passages. The bleeder hole being of smaller area than passage 416, pressure is maintained in chamber 368 when the latter passage is open in spite of the continuous leakage through 460. As previously stated, the initial power movement of piston 346 closes off the supply passage 416. Shortly thereafter, however, the previously traced auxiliary fluid passages 424 and 432 become effective to supply fluid to chamber 368 through passage 430. The proportioning of the parts is such that only a negligible leakage from chamber 368 through bleeder passage 460 occurs between the closure of passage 416 and the opening of passage 430.

In order to prevent faulty operation of the shut-off valve 382, the chamber space at the left-hand end thereof (Fig. 27) is continuously connected to exhaust through a secondary passage 456, and the chamber space at the righthand side thereof is continuously connected to exhaust through a secondary passage 458. It is seen, therefore, that any internal oil leakages which may occur around the moving parts of the motor, are fully compensated for and rendered of no effect. As to external oil leakages, it will be appreciated that an oil-tight connection may be made between the base of the motor and the supporting structure, thus effectively overcoming any leakage at this point.

Although only a few illustrative embodiments of the invention have been described, it will be appreciated that the invention may be embodied in many further and widely different forms. The described embodiments, accordingly, are to be rewarded in an illustrative and not in a limiting sense.

What is claimed is:

1. Fluid pressure operated motor mechanism comprising, in combination, a member disposed to be moved between first and second limit positions under the influence of a fluid pressure differential; a reversing valve movable between first and second positions to control the direction of movement of said member; continuously acting means for urging said valve to one of said positions; means including a passage opened and closed by movement of said member for applying fluid pressure to said valve to cause it to move to said other position and for relieving said fluid pressure; and means including a secondary passage rendered effective when said valve is in said other position for applying fluid pressure thereto.

2. Fluid pressure operated motor mechanism comprising, in combination, a member disposed to be moved between first and second limit positions under the influence of a fluid pressure differential; a reversing valve movable between first and second positions to control the direction of movement of said member; continuously acting means for urging said valve to one of said positions; means including a passage opened and closed by movement of said member for applying fluid pressure to said valve to cause it to move to said other position and for relieving said fluid pressure; and means defining a secondary passage for exhausting fluid from said valve to thereby prevent the building up of a pressure in opposition to said first mentioned pressure.

3. Fluid pressure operated motor mechanism comprising, in combination, a housing formed to define a vane chamber and a valve chamber; a vane operatively mounted in said vane chamber and disposed to be moved therein in respectively opposite directions under the influence of fluid pressure; a shaft for said vane; a piston type reversing valve movably mounted in said valve chamber and disposed to control the direction of operation of said vane; continuously acting means for urging said valve to one limit position thereof; means for admitting fluid pressure to said valve chamber to move said valve to an opposite limit position and for exhausting said fluid pressure including means defining a fluid circuit leading to said valve chamber; said shaft having port means alternately registerable with said passage to cause said valve chamber to be supplied with fluid pressure when said vane reaches one limit position and to cause said valve chamber to be exhausted when said vane reaches the other limit position.

4. Fluid pressure operated motor mechanism comprising, in combination, a member disposed to be moved under the influence of a fluid pressure differential; a reversing valve movable between first and second positions to control the direction of movement of said member; continuously acting means for urging said valve to one of said positions; means for subjecting said valve to fluid pressure to cause it to move to the other of said positions and for exhausting said fluid pressure; and means for stopping said motor comprising means for completing an auxiliary exhaust circuit for said valve.

5. Fluid pressure operated motor mechanism comprising, in combination, a member disposed to be moved under the influence of a fluid pressure differential; a reversing valve for controlling the direction of movement of said member; a housing formed to define chambers for said member and said valve; inlet and exhaust means associated with said member and said valve; and a single stop control device selectively movable to control said inlet means to vary the speed of movement of said member and to control said valve to cause said motor to stop in a selected position.

6. Fluid pressure operated motor mechanism comprising, in combination, a housing formed to define a vane chamber and a valve chamber; a vane operatively mounted in said vane chamber and disposed to be moved therein in respectively opposite directions under the influence of fluid pressure; a shaft for said vane; a piston type reversing valve movably mounted in said valve chamber and disposed to control the direction of operation of said vane; continuously acting means for urging said valve to one limit position thereof; means for admitting fluid pressure to said valve chamber to move said valve to an opposite limit position and for exhausting said fluid pressure including means defining a fluid circuit leading to said valve chamber; said shaft having port means alternately registerable with said circuit to cause said valve chamber to be supplied with fluid pressure when said vane reaches one limit position and to cause said valve chamber to be exhausted when said vane reaches the other limit position; and stop control means including means associated with said valve chamber for preventing the building up of a pressure in said valve chamber.

7. Fluid pressure operated motor mechanism comprising, in combination, a housing formed to define a vane chamber and a valve chamber; a vane operatively mounted in said vane chamber and disposed to be moved therein in respectively opposite directions under the influence of fluid pressure; a shaft for said vane; a piston type reversing valve movably mounted in said valve chamber and disposed to control the direction of operation of said vane; continuously acting means for urging said valve to one limit position thereof; means for admitting fluid pressure to said valve chamber to move said valve to an opposite limit position and for exhausting said fluid pressure including means defining a fluid circuit leading to said valve chamber; said shaft having port means alternately registerable with said circuit to cause said valve chamber to be supplied with fluid pressure when said vane reaches one limit position and to cause said valve chamber to be exhausted when said vane reaches the other limit position and stop control means including a valve associated with said fluid circuit and operable to prevent a building up of pressure through said fluid circuit in said valve chamber.

8. Fluid pressure operated motor mechanism comprising, in combination, a housing formed to define a vane chamber and a valve chamber; a vane operatively mounted in said vane chamber and disposed to be moved therein in respectively opposite directions under the influence of fluid pressure; a shaft for said vane; a piston type reversing valve movably mounted in said valve chamber and disposed to control the direction of operation of said vane; continuously acting means for urging said valve to one limit position thereof; means for admitting fluid pressure to said valve chamber to move said valve to an opposite limit position and for exhausting said fluid pressure including means defining a pair of branch fluid circuits each adapted to be placed in communication with said valve chamber; said shaft having a first port associated with one of said branch circuits and arranged to place the associated branch circuit in communication with said valve chamber when said vane approaches one limit of its travel and having a second port associated with the other of said branch circuits and arranged to place said other branch circuit in communication with said valve chamber as said vane approaches the other limit of its travel.

HUMPHREY F. PARKER.